US008222880B2

(12) United States Patent
Kao et al.

(10) Patent No.: US 8,222,880 B2
(45) Date of Patent: Jul. 17, 2012

(54) DC-DC CONVERSION DEVICE WITH DIGITALLY CONTROLLED COMPARATOR

(75) Inventors: Nien-An Kao, Xindian (TW); Tsung-Yuan Chiang, Banciao (TW)

(73) Assignee: Princeton Technology Corporation, Hsin Tien, Taipei County (TW)

( * ) Notice: Subject to any disclaimer, the term of this patent is extended or adjusted under 35 U.S.C. 154(b) by 579 days.

(21) Appl. No.: 12/405,740

(22) Filed: Mar. 17, 2009

(65) Prior Publication Data

US 2009/0237061 A1 Sep. 24, 2009

(30) Foreign Application Priority Data

Mar. 18, 2008 (TW) ................................ 97109452 A

(51) Int. Cl.
*G05F 1/00* (2006.01)
*H02M 3/335* (2006.01)

(52) U.S. Cl. ..................... 323/284; 323/274; 363/21.09; 363/21.17

(58) Field of Classification Search .................. 323/274, 323/284, 287; 363/21.09, 21.17
See application file for complete search history.

(56) References Cited

U.S. PATENT DOCUMENTS

| | | | | |
|---|---|---|---|---|
| 7,728,573 | B2 * | 6/2010 | Capilla et al. | 323/288 |
| 2002/0190701 | A1 * | 12/2002 | Miyazaki | 323/284 |
| 2005/0212502 | A1 * | 9/2005 | Casey et al. | 323/284 |
| 2007/0090821 | A1 * | 4/2007 | Imai et al. | 323/284 |
| 2007/0247131 | A1 * | 10/2007 | Sohma | 323/284 |

* cited by examiner

*Primary Examiner* — Adolf Berhane
*Assistant Examiner* — Gary Nash
(74) *Attorney, Agent, or Firm* — Muncy, Geissler, Olds & Lowe, PLLC

(57) ABSTRACT

A DC-DC conversion device is provided. The DC-DC conversion device includes a control signal generator, a conversion module and a comparison module. The control signal generator generates a control signal according to a delay signal. The conversion module is coupled to the control signal generator to convert an input voltage to an output voltage according to the control signal. The comparison module is coupled to the control signal generator and conversion module to compare the output voltage with a reference voltage and output the delay signal according to the comparison result, an enable signal and a clock signal.

14 Claims, 5 Drawing Sheets

DC-DC CONVERSION DEVICE WITH DIGITALLY CONTROLLED COMPARATOR

CROSS REFERENCE TO RELATED APPLICATIONS

This Application claims priority of Taiwan Patent Application No. 097109452, filed on Mar. 18, 2008, the entirety of which is incorporated by reference herein.

BACKGROUND OF THE INVENTION

1. Field of the Invention

The invention relates to a conversion device, and more particularly to a power conversion device with digitally controlled comparator.

2. Description of the Related Art

Electronic devices usually consist of a plurality of different electronic elements, and each electronic element requires different operating voltages. Thus, a power conversion device is used to generate a stable voltage with different voltage levels for those semiconductor devices. Such as, a DC-to DC conversion module is a semiconductor switch device for converting a DC voltage to a certain level and supplies the converted DC voltage to a load.

Please refer to FIG. 1. FIG. 1 is a schematic diagram of a conventional DC-DC conversion device. As shown in FIG. 1, the DC-DC converter with analog comparator comprises a control signal generator 12, a conversion module 14, resistors, $R_1$ and $R_2$, and a comparator 16. The control signal generator 12 receives a clock signal $S_{CLK}$ and a feedback signal $S_{COM}$ form the comparator 16, and then transforms those input signals into control signal $S_C$ by a series of logic operations. The control signal $S_C$ controls the conversion module 14 to convert an input voltage $V_{DD}$ to generate an output voltage $V_{OUT}$. The divider resistors $R_1$ and $R_2$ divide the output voltage $V_{OUT}$ to generate a divided voltage $V_{DIV}$. The comparator 16 compares the divided voltage $V_{DIV}$ and a reference voltage $V_{REF}$ and then delivers feedback signal $S_{COM}$ to control signal generator 12. The control signal generator 12 regenerates the control signal $S_C$ according to the change of the feedback signal $S_{COM}$. The conversion module 14 changes the voltage level of the output voltage $V_{OUT}$ by the control signal $S_C$.

However, the response of the control signal $S_C$ is very fast with the changing of feedback signal $S_{COM}$. Thus, when an abnormal pulse occurs in feedback signal $S_{COM}$ due to noises (such as a clock signal couples to $V_{DIV}$ through parasitic capacitance), the output voltage $V_{OUT}$ of the conversion module 14 of the power conversion device 10 may not keep stable in the vicinity of a predetermined voltage level. Thus, the electronic devices connected to the DC-DC conversion device 10 doesn't work properly. Moreover, with a regulation mechanism applied to the DC-DC converter output, the output would have ripple voltage at the regulation level. The quantity of the output ripple depends on the feedback signal $S_{COM}$ of the comparator 16 and the loading of the electronic devices coupled to the power conversion device 10. Thus, large ripple voltage can be regarded as an interference to the electronic device connected to DC-DC converter.

Therefore, a DC-DC conversion device can generate accurate output voltage level and limit the variation of ripple voltage is desired

BRIEF SUMMARY OF THE INVENTION

An objective of an embodiment of the invention provides a voltage conversion device with a digitally controlled comparator. The voltage conversion device increases the accuracy of the output voltage and limits the variation of the ripple voltage.

An embodiment of the invention provides a DC-DC converting device with a digitally controlled comparator. The DC-DC conversion device comprises a control signal generator, a conversion module and a comparison module and two resistors, $R_1$ and $R_2$. The control signal generator generates a control signal according to a delay signal. The conversion module is coupled to the control signal generator to convert an input voltage to an output voltage according to the control signal. The comparison module is coupled to the control signal generator and conversion module through a voltage divider to compare the output voltage with a reference voltage and output the delay signal according to the comparison result, an enable signal and a clock signal.

Another embodiment of the invention provides a voltage conversion method with a concept of digitally controlled comparator. The method comprises: providing a control signal for controlling a voltage conversion operation; converting an input voltage into an output voltage according to the control signal; comparing the output voltage with a reference voltage to generate a comparison signal; generating a delay signal according to an enable signal, a clock signal and the comparison signal; adjusting the time for the voltage conversion operation according to the control signal and the delay signal.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
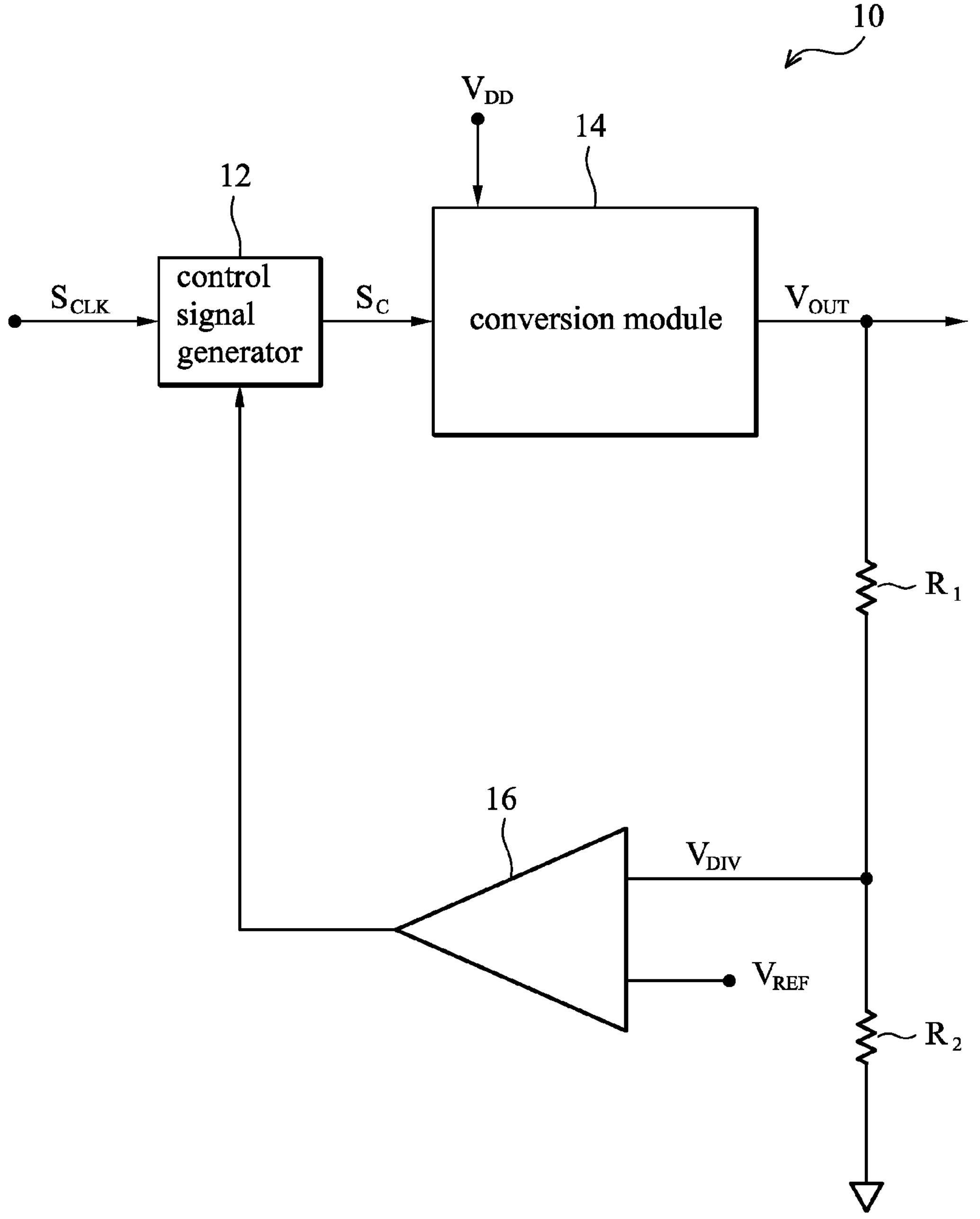
FIG. 1 PRIOR ART
FIG. 1 is a schematic diagram of a conventional DC-DC conversion device.
Figure 2:
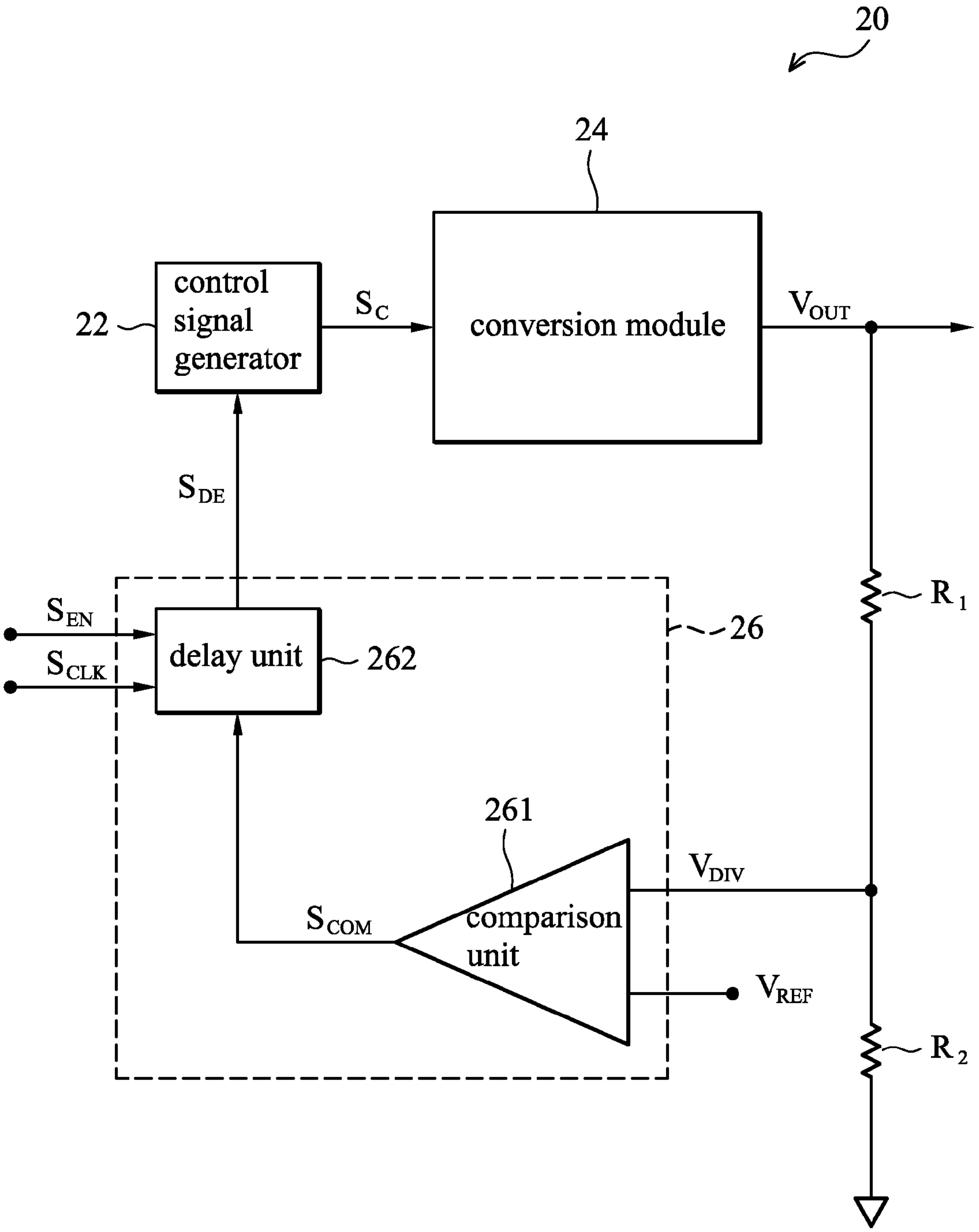
FIG. 2 is a schematic diagram of an embodiment of a DC-DC conversion device according to the invention.

Please refer to FIG. 2. FIG. 2 is a schematic diagram of an embodiment of a DC-DC conversion device according to the invention. As shown in FIG. 2, the DC-DC conversion device 20 comprises a control signal generator 22, a conversion module 24, and a comparison module 26. The control signal generator 22 generates a control signal $S_C$ according to a delay signal $S_{DE}$. The conversion module 24 is coupled to the control signal generator 22 and converts an input voltage $V_{DD}$ to an output voltage $V_{OUT}$ according to the control signal $S_C$. The comparison module 26 is coupled to voltage divider with 2 resistors, $R_1$ and $R_2$, and the control signal generator 22, and compares a divided voltage $V_{DIV}$ based on the output voltage $V_{OUT}$ with a reference voltage $V_{REF}$ to generate the delay signal $S_{DE}$ according to the comparison result, an enable signal $S_{EN}$ and a clock signal $S_{CLK}$. The conversion module 24 is a voltage converter. In preferable embodiment, the conversion module 24 is a DC-to-DC converter.

The DC-DC conversion device 20 further comprises a voltage divider with first resistor $R_1$ and second resistor $R_2$ to divide the output voltage $V_{OUT}$ to generate a divided voltage $V_{DIV}$. The first terminal of the first resistor $R_1$ is coupled to the conversion module 24 and the second terminal of the first resistor $R_1$ is coupled to the comparison module 26. The first terminal of the second resistor $R_2$ is coupled to the second terminal of the first resistor $R_1$, and the second terminal of the second resistor $R_2$ is grounded. The divider resistors $R_1$ and $R_2$ divide the output voltage $V_{OUT}$ to generate a divided voltage $V_{DIV}$ as the input of the comparison module 26.

The comparison module 26 comprises a comparison unit 261 and at least one delay unit 262. The comparison unit 261 is coupled to the divider resistors $R_1$ and $R_2$ to compare the divided voltage $V_{DIV}$ with the reference voltage $V_{REF}$ and generates a comparison signal $S_{COM}$ according to the comparison result. The delay unit 262 is coupled to the comparator 262 and the control signal generator 22 to generate the delay signal $S_{DE}$ according to the enable signal $S_{EN}$, clock signal $S_{CLK}$ and the comparison signal $S_{COM}$. In preferable embodiment, the comparison unit 261 is a comparator.

Figure 3:
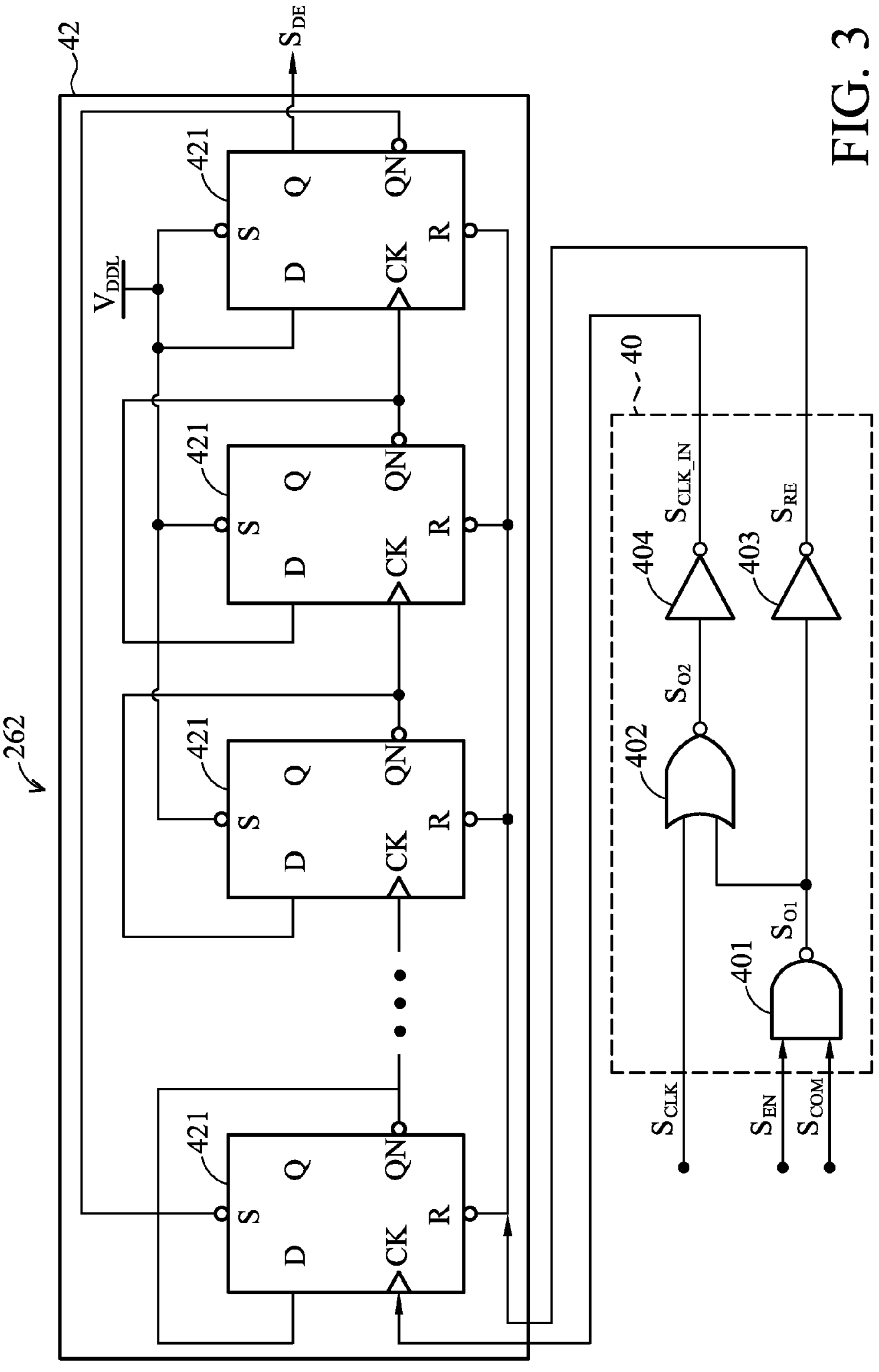
FIG. 3 is a schematic diagram of an embodiment of a delay unit according to the invention.

Please refer to FIG. 3. FIG. 3 is a schematic diagram of an embodiment of a delay unit according to the present invention. The delay unit 262 comprises a control circuit 40 and a processing circuit 42. The control circuit 40 generates a clock input signal $S_{CLK\_IN}$ and a reset signal $S_{RE}$ according to the enable signal $S_{EN}$, clock signal $S_{CLK}$ and the comparison signal $S_{COM}$. The processing circuit 42 is coupled to the control circuit 40 and the control signal generator 22 and generates the delay signal $S_{DE}$ according to the clock input signal $S_{CLK\_IN}$ and the reset signal $S_{RE}$.

The control circuit 40 comprises a first computing unit 401, a second computing unit 402, a first processing unit 403 and a second processing unit 404. The first computing unit 401 executes a first logic operation to the enable signal $S_{EN}$ and the comparison signal $S_{COM}$ to generate a first operation signal $S_{O1}$. The second computing unit 402 executes a second logic operation to the clock signal $S_{CLK}$ and the first operation signal $S_{O1}$ to generate a second operation signal $S_{O2}$. The first processing unit is coupled to the first computing unit 401 to perform signal processing for the first operation signal $S_{O1}$ to generate the reset signal $S_{RE}$. The second computing unit 404 is coupled to the second computing unit 402 to perform signal processing for the second operation signal $S_{O2}$ to generate the clock input signal $S_{CLK\_IN}$.

In preferable embodiment, the first computing unit 401 is a NAND gate and the first logic operation is the NAND operation. The first computing unit 401 executes the NAND operation on the enable signal $S_{EN}$ and the comparison signal $S_{COM}$ to generate the first operation signal $S_{O1}$. The second computing unit 402 is a NOR gate and the second logic operation is the NOR operation. The second computing unit 402 executes the NOR operation on the clock signal $S_{CLK}$ and the first operation signal $S_{O1}$ to generate the second operation signal $S_{O2}$. The first processing unit 403 and the second processing unit 404 are inverters. The first processing unit 403 inverts the first operation signal $S_{O1}$ to generate the reset signal $S_{RE}$, and the second processing unit 404 inverts the second operation signal $S_{O2}$ to generate the clock input signal $S_{CLK\_IN}$.

The processing circuit 42 comprises at least one delay element 421 coupled to the first processing unit 403, the second processing unit 404, and the control signal generator 22. The delay element 421 delays the clock input signal $S_{CLK\_IN}$ according to the reset signal $S_{RE}$ to generate the delay signal $S_{DE}$. In one embodiment, the delay element 421 is a Flip Flop. The length of the delay time depends on the number of the delay units 421.

The operation of the delay unit 262 is described as following. When the enable signal $S_{EN}$ is changed from logic 1 to logic 0, and remains in this state longer than predetermined time delay by the delay unit 262, the control circuit 40 will send out a reset signal $S_{RE}$ to delay unit 262. The delay unit blocks clock input signal $S_{CLK\_IN}$ to conversion module 22 after receiving the reset signal $S_{RE}$ and generates a delay signal $S_{DE}$ to conversion module 22. The conversion module 22 stops to perform voltage transformation. When the enable signal $S_{EN}$ is set to logic 1, the operation of control circuit 40 depends on the comparator signal $S_{COM}$. When the divided voltage $V_{DIV}$ is smaller than the reference voltage $V_{REF}$, the delay unit 262 doesn't blocks clock input signal $S_{CLK\_IN}$ to conversion module 22. Thus, the conversion module 22 continues to perform voltage transformation. When the divided voltage $V_{DIV}$ increases gradually and becomes larger than the reference voltage $V_{REF}$ and the comparator signal $S_{COM}$ changes to a new state at this moment. If the duration of the new state is longer than predetermined delay time created by delay unit 262, the delay unit blocks clock input signal $S_{CLK\_IN}$ to conversion module 22 after receiving the reset signal $S_{RE}$ and generates a delay signal $S_{DE}$ to conversion module 22. The conversion module 22 stops to perform voltage transformation. The predetermined delay time created by the delay unit 262, which depends on the number of the delay element 421. In one embodiment, the DC-DC conversion device 20 comprises two delay units with 2 opposite comparator signals ($S_{COM}$) to achieve double direction control. Furthermore, the delay time can not only be adjusted according to the number of Flip Flops, but also to be adjusted by changing the frequency of the clock signal.

Figure 4:
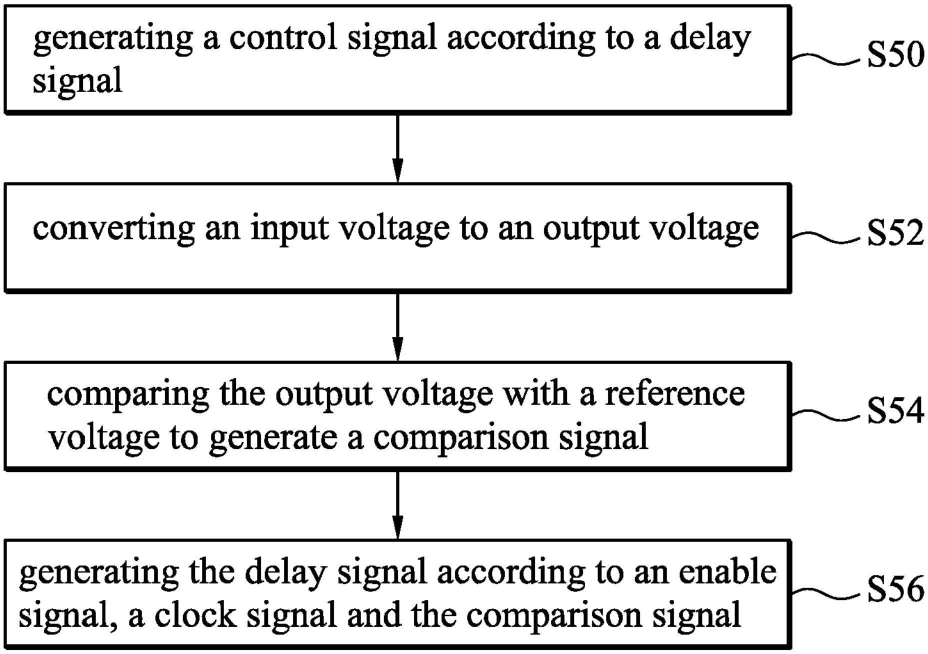
FIG. 4 is a flowchart of an embodiment of a DC-DC conversion method according to the invention.

Please refer to FIG. 4. FIG. 4 is a flowchart of an embodiment of a DC-DC conversion method according to the invention. As shown in FIG. 4, The DC-DC conversion method comprises the following steps:

Step S50: a control signal is generated according to a delay signal, wherein the control signal is for controlling a voltage conversion operation;

Step S52: an input voltage is converted to an output voltage;

Step S54: the output voltage and a reference voltage are compared to generate a comparison signal, wherein in one embodiment, step S54 further comprises: voltage-dividing the output voltage to generate a divided voltage and comparing the reference voltage with the divided voltage to generate the comparison signal;

Step S56: the delay signal is generated according to an enable signal, a clock signal and the comparison signal.

Figure 5:
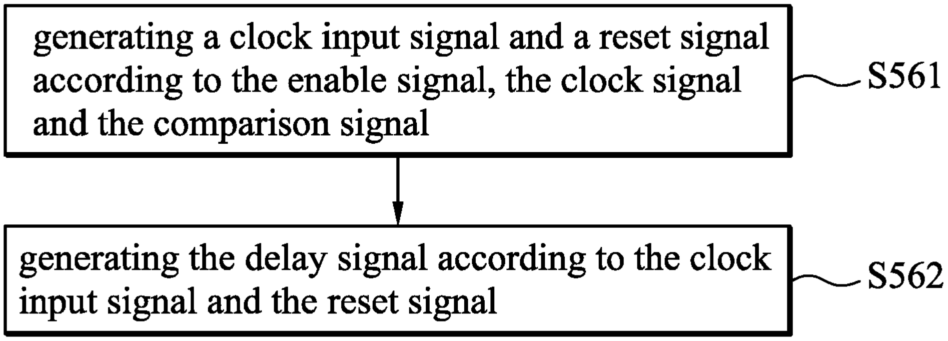
FIG. 5 is a flowchart of an embodiment of the step S56 of the DC-DC conversion method according to the invention.

Please refer to FIG. 5. FIG. 5 is a flowchart of an embodiment of the step S56 of the power conversion method according to the invention. The step S56 further comprises:

Step S561: generating a clock input signal and a reset signal according to the enable signal, the clock signal and the comparison signal; and Step S562: generating the delay signal according to the clock input signal and the reset signal.

Figure 6:
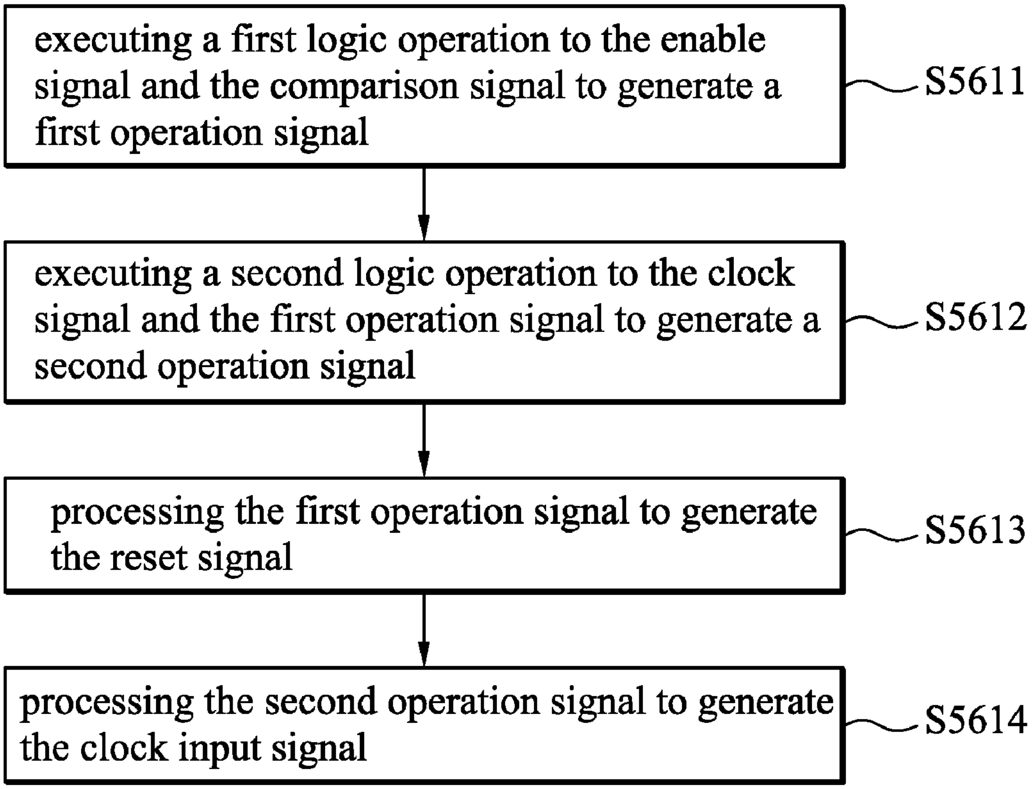
FIG. 6 is a flowchart of an embodiment of the step S561 of the DC-DC conversion method according to the invention.

Please refer to FIG. 6. FIG. 6 is a flowchart of an embodiment of the step S561 of the DC-DC conversion method according to the invention. The step S561 further comprises:

Step S5611: executing a first logic operation to the enable signal and the comparison signal to generate a first operation signal, wherein step S5611 executes the NAND operation to the enable signal and the comparison signal to generate the first operation signal;

Step S5612: executing a second logic operation to the clock signal and the first operation signal to generate a second operation signal, wherein step S5612 executes the NOR operation to the enable signal and the comparison signal to generate the first operation signal;

Step S5613: processing the first operation signal to generate the reset signal; and Step S5614: processing the second operation signal to generate the clock input signal.

In one embodiment, steps S5613 and S5614 respectively inverts the first operation signal and the second operation signal to generate the reset signal and the clock input signal correspondingly. In step S562, the clock input signal is delayed according to the reset signal to generate the delay signal.

As described above, the DC-DC conversion device of the present application converts the input voltage into output voltages with different voltage levels. The DC-DC conversion device further comprises a delay module to control the time for the conversion module converts the input voltage to output voltage. Thus, this can increase the accuracy of the output voltage and restrain the variation of the ripple voltage efficiently.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A DC-DC conversion device, comprising:

a control signal generator to generate a control signal according to a delay signal;

a conversion module coupled to the control signal generator for converting an input voltage into an output voltage according to the control signal; and a comparison module coupled to the control signal generator and the conversion module for comparing an output voltage of the DC-DC conversion device with a reference voltage to generate a comparison result and outputting the delay signal according to the comparison result, an enable signal and a clock signal, wherein the comparison module comprises:

a voltage divider coupled to the conversion module and the comparison module to generate a divided voltage by dividing the output voltage, wherein the voltage divider comprises:

a first resistor having a first terminal coupled to the conversion module and a second terminal coupled to the comparison module; and a second resistor having a first terminal coupled to the second terminal of the first resistor, and a grounded second terminal, wherein the first resistor and the second resistor divide the output voltage to generate and input the divided voltage to the comparison module a comparison unit coupled to the voltage divider for comparing the reference voltage and the divided voltage resulted from the voltage divider to generate a comparison signal; and at least one delay unit coupled to the comparison unit and the control signal generator to generate the delay signal according to the comparison signal, the enable signal and the clock signal, wherein the delay unit comprises:

a control circuit for generating a clock input signal and a reset signal according to the comparison signal, the enable signal and the clock signal, wherein the control circuit comprises:

a NAND gate for executing a NAND operation on the enable signal and the comparison signal to generate a first operation signal;

a second computing unit coupled to the first computing unit for executing a second logic operation on the clock signal and the first operation signal to generate a second operation signal;

a first processing unit coupled to the first computing unit for processing the first operation signal to generate the reset signal; and a second processing unit coupled to the second computing unit for processing the second operation signal to generate the clock input signal; and a processing circuit coupled to the control circuit for generating the delay signal according to the clock input signal and the reset signal.

2. The device as claimed in claim 1, wherein the second computing unit is a NOR gate, the second logic operation is a NOR operation, and the second computing unit executes the NOR operation on the clock signal and the first operation signal to generate the second operation signal.

3. The device as claimed in claim 2, wherein the first processing unit and the second processing unit are inverters.

4. The device as claimed in claim 3, wherein the delay unit includes a flip flop.

5. The device as claimed in claim 1, wherein the first processing unit inverts the first operation signal to generate the reset signal, and the second processing unit inverts the second operation signal to generate the clock input signal.

6. The device as claimed in claim 1, wherein the processing circuit comprises:

at least one delay unit coupled to a first processing unit, a second processing unit and the control signal generator for delaying the clock input signal to generate the delay signal according to the reset signal.

7. The device as claimed in claim 1, wherein the comparison module includes a comparator.

8. The device as claimed in claim 1, wherein the conversion module is a voltage converter.

9. The device as claimed in claim 1, wherein the conversion module is a DC to DC converter.

10. A voltage conversion method, comprising:

(a) providing a control signal for controlling a voltage conversion operation;

(b) converting an input voltage into an output voltage according to the control signal;

(c) comparing the output voltage with a reference voltage to generate a comparison signal, wherein the step (c) further comprises:

(c1) voltage-dividing the output voltage to generate a divided voltage; and (c2) comparing the reference voltage with the divided voltage to generate the comparison signal;

(d) generating a delay signal according to an enable signal, a clock signal and the comparison signal wherein the step (d) further comprises:

(d1) generating a clock input signal and a reset signal according to the enable signal, the clock signal and the comparison signal, wherein the step (d1) further comprises:

(d11) executing a NAND operation on the enable signal and the comparison signal to generate a first operation signal;

(d12) executing a second logic operation on the clock signal and the first operation signal to generate a second operation signal;

(d13) processing the first operation signal to generate the reset signal; and (d14) processing the second operation signal to generate the clock input signal; and (d2) generating the delay signal according to the clock input signal and the reset signal; and (e) adjusting the time for the voltage conversion operation according to the control signal and the delay signal.

11. The method as claimed in claim 10, wherein the step (d12) executes the NOR operation on the clock signal and the first operation signal to generate the second operation signal.

12. The method as claimed in claim 11, wherein the step (s14) inverts the second operation signal to generate the clock input signal.

13. The method as claimed in claim 10, wherein the step (d13) inverts the first operation signal to generate the reset signal.

14. The method as claimed in claim 10, wherein the step (d2) further comprises:

(d21) delaying the clock input signal to generate the delay signal according to the reset signal.

* * * * *